US010639968B2

(12) United States Patent
Lofvendahl et al.

(10) Patent No.: US 10,639,968 B2
(45) Date of Patent: May 5, 2020

(54) AIR SUPPLY ARRANGEMENT

(71) Applicant: Volvo Car Corporation, Gothenburg (SE)

(72) Inventors: Anders Lofvendahl, Gothenburg (SE); Stefan Winter, Gothenburg (SE); Alexander Warda, Molndal (SE); Erik Andersson, Savedalen (SE)

(73) Assignee: Volvo Car Corporation, Gothenburg (SE)

( * ) Notice: Subject to any disclaimer, the term of this patent is extended or adjusted under 35 U.S.C. 154(b) by 313 days.

(21) Appl. No.: 15/422,730

(22) Filed: Feb. 2, 2017

(65) Prior Publication Data
US 2017/0232823 A1 Aug. 17, 2017

(30) Foreign Application Priority Data

Feb. 11, 2016 (EP) .................................... 16155259

(51) Int. Cl.
*B60H 3/00* (2006.01)
*B03C 3/45* (2006.01)
(Continued)

(52) U.S. Cl.
CPC ............ *B60H 3/0078* (2013.01); *B03C 3/12* (2013.01); *B03C 3/155* (2013.01); *B03C 3/368* (2013.01); *B03C 3/38* (2013.01); *B03C 3/41* (2013.01); *B03C 3/45* (2013.01); *B60H 1/28* (2013.01); *B62D 25/081* (2013.01);
(Continued)

(58) Field of Classification Search
CPC combination set(s) only.
See application file for complete search history.

(56) References Cited

U.S. PATENT DOCUMENTS 4,909,566 A * 3/1990 Hashimoto .......... B60H 1/0055
296/192
5,055,115 A * 10/1991 Yikai ..................... B01D 53/32
96/59
(Continued)

FOREIGN PATENT DOCUMENTS

CN 204 701 421 U 10/2015
DE 43 29 330 A1 3/1994
(Continued)

OTHER PUBLICATIONS https://www.youtube.com/watch?v=QlxULMR0QkM (Published: May 2016).*

*Primary Examiner* — Christopher P Jones
*Assistant Examiner* — Sonji Turner
(74) *Attorney, Agent, or Firm* — Snyder, Clark, Lesch & Chung, LLP

(57) ABSTRACT

The present disclosure relates to an air supply arrangement for a vehicle, the air supply arrangement comprising an air supply duct, an ionising member located in the air supply duct and a passive collecting member located in the air supply duct downstream of the ionising member, wherein a shortest path length of an air flow between the ionising member and the collecting member is in the range of from 20 to 70 centimeters (cm), preferably in the range of from 25 to 50 cm. The disclosure further relates to an external portion of such an air supply arrangement and a vehicle with such an air supply arrangement.

18 Claims, 5 Drawing Sheets

(51) Int. Cl.
*B03C 3/155* (2006.01)
*B62D 25/08* (2006.01)
*B03C 3/38* (2006.01)
*B60H 1/28* (2006.01)
*B03C 3/36* (2006.01)
*B03C 3/41* (2006.01)
*B03C 3/12* (2006.01)

(52) U.S. Cl.
CPC ...... *B03C 2201/06* (2013.01); *B03C 2201/10* (2013.01); *B03C 2201/30* (2013.01)

(56) References Cited

U.S. PATENT DOCUMENTS

| | | | | |
|---|---|---|---|---|
| 5,433,772 | A * | 7/1995 | Sikora | B03C 3/32 422/120 |
| 5,454,859 | A * | 10/1995 | Chiba | B03C 3/363 55/385.3 |
| 5,456,741 | A * | 10/1995 | Takahara | B03C 3/12 95/6 |
| 5,501,716 | A * | 3/1996 | Chiba | B03C 3/363 55/309.1 |
| 5,518,531 | A * | 5/1996 | Joannu | B03C 3/38 361/226 |
| 6,364,935 | B1 * | 4/2002 | Wennerstrom | B03C 3/155 55/528 |
| 6,991,532 | B2 * | 1/2006 | Goldsmith | A61L 9/015 210/760 |
| 7,132,010 | B2 * | 11/2006 | Carlsson | B03C 3/155 96/55 |
| 7,824,477 | B2 * | 11/2010 | Kang | B03C 3/82 313/351 |
| 8,889,079 | B2 * | 11/2014 | Zahedi | B01D 53/323 422/171 |
| 9,108,490 | B2 * | 8/2015 | Bergholtz | B62D 25/081 |
| 9,919,587 | B2 * | 3/2018 | Wennerstrom | B03C 3/49 |
| 2005/0058582 | A1 * | 3/2005 | Paumier | B60H 3/0078 422/186.04 |
| 2012/0187723 | A1 * | 7/2012 | Bergholtz | B60H 1/28 296/192 |
| 2014/0017987 | A1 * | 1/2014 | Andersson | B60H 1/28 454/147 |
| 2015/0290657 | A1 * | 10/2015 | Wright | B03C 3/011 95/69 |
| 2016/0229267 | A1 * | 8/2016 | Wennerstrom | B03C 3/49 |

FOREIGN PATENT DOCUMENTS

| | | |
|---|---|---|
| EP | 2479046 A1 | 7/2012 |
| EP | 2 551 017 A2 | 1/2013 |
| WO | 98/50162 A1 | 11/1998 |

* cited by examiner

AIR SUPPLY ARRANGEMENT

RELATED APPLICATION

This application claims priority under 35 U.S.C. § 119 based on European Patent Application No. 16155259.1, filed Feb. 11, 2016, the disclosure of which is hereby incorporated by reference herein.

TECHNICAL FIELD

The present disclosure relates to an air supply arrangement for a vehicle, which air supply arrangement comprises an air supply duct, an ionising member and a passive collecting member. The disclosure further relates to a vehicle with such an air supply arrangement.

BACKGROUND

Many modern vehicles are provided with a climate control system, e.g. an HVAC system, i.e. a heating, ventilation and air conditioning system, in order to provide a comfortable climate in the passenger compartment. Typically, outside air is supplied to the climate control system from ambient air outside of the vehicle through an air supply duct. Sometimes, the outside air is polluted, and there may, hence, be a wish to clean the air before it enters the passenger compartment.

Patent document EP 2 479 046 A1 describes an air supply duct comprising a cowl including a precipitation collection means. This configuration helps to at least partly prevent precipitation born by the air from entering the passenger compartment.

However, there may also be a desire to prevent particles being borne by the air from entering the passenger compartment. There is therefore a wish for an improved air supply arrangement.

SUMMARY

Embodiments of the present disclosure overcome or ameliorate at least one of the disadvantages of the prior art, or to provide a useful alternative.

Some aspects of the invention may be achieved by the subject matter of claim 1. Embodiments are set forth in the appended dependent claims, in the following description and in the drawings.

Thus the disclosed invention relates to an air supply arrangement for a vehicle. The air supply arrangement comprises an air supply duct, an ionising member located in the air supply duct and a passive collecting member located in the air supply duct downstream of the ionising member, wherein a shortest path length of an air flow between the ionising member and the collecting member is in the range of from 20 to 70 centimeters (cm), preferably in the range of from 25 to 50cm.

The air supply arrangement is adapted to convey the air to a climate control system of the vehicle, such as an HVAC system, in order to be able to provide a passenger compartment of the vehicle with a desired climate.

The ionising member is utilized to charge particles being transported by the air passing the air supply duct. The collecting member is adapted to catch particles having been charged by the ionising member. The collecting member is passive, i.e. it has no electrical connection and there is no voltage applied over it. The ionising member and the collecting member together form an air cleaning unit. The function of such air cleaning units is known from e.g. patent document WO 98/50162 describing a method and a device for cleaning of a gaseous fluid.

The shortest path length of the air flow is determined as the theoretically shortest possible way for the air to go when passing through the air supply arrangement. The shortest path length starts at the ionising member and ends at the collecting member. The shortest path length follows the shortest possible geometrical path between the ionising member and the collecting member.

As an alternative, the path length of the air supply arrangement may be determined along a central air flow line in the air flow. The central air flow line is defined as being located in the geometrical centre of the possible flow. The central air flow line may in the air supply arrangement described herein have a path length being in the range of from 25 to 75 cm, preferably in the range of from 30 to 60cm.

The location of the collecting member at a distance in the claimed range away from the ionising member makes it easy to perform maintenance of the collecting member when desired, e.g. exchanging a filter, e.g. when the vehicle is at a garage for service.

Moreover, with the claimed length, it is possible to locate the collecting member in an internal portion of the air supply arrangement, i.e. a portion located within the passenger compartment of the vehicle, while the ionising member is located in an external portion of the air supply arrangement, i.e. a portion outside the passenger compartment.

The collecting member may be a polymer filter, i.e. a filter made of polymer fibres. The filter may e.g. be a dielectric polymer filter. Such filters are examples of passive filters. They are further easy to handle, e.g. during installation and exchange.

The ionising member may comprise at least one discharge unit, each discharge unit comprising at least one corona tip or ion brush. The ionising member may comprise from 1 to 10 discharge units, preferably from 2 to 8 discharge units, more preferably from 3 to 5 discharge units, e.g. 4 discharge units. The discharge units may be located next to each other, e.g. arranged in one or more rows or groups.

The at least one discharge unit may comprise a grounding element, which preferably is ring-shaped, more preferably circular. The grounding element may alternatively have e.g. a square, rectangular, hexagonal or other polygonal shape, an elliptic or oval shape. The grounding element surrounds the corona tip or the ion brush, preferably in such a way that the corona tip or the ion brush is located in the centre of the grounding element. Thereby the air is charged when passing the at least one discharge unit.

The grounding element may have a maximal transverse extension in the range of from 20 to 150 millimeters (mm), preferably in the range of from 50 to 100 mm, more preferably in the range of from 60 to 90 mm, most preferably in the range of from 70 to 80 mm. If the grounding element is circular, the maximal transverse extension is given by its diameter.

One grounding element may be arranged together with two or more corona tips or ion brushes in a discharge unit, although it is preferred to arrange them pairwise, such that one corona tip or one ion brush together with a surrounding grounding element forms a discharge unit.

The ionising member may utilize a voltage in the range of from 2 to 15 kV, preferably in the range of from 5 to 10 kV, more preferably in the range of from 6 to 8 kV. This voltage has been found to give the desired ionisation of particles in the air. The voltage is applied over each discharge unit.

The air supply arrangement may further comprise a fan unit, preferably being located downstream of the collecting member. This location may be advantageous, since the air then has passed the collecting member and thus is cleaner, as compared to locating the fan unit further upstream. However, a fan unit may also, as an alternative or a complement, be located in alternative positions, such as between the ionising member and the collecting member or upstream of the ionising member. It would also be possible to have a fan unit downstream of the air supply arrangement, e.g. in a climate control system of the vehicle.

In case the air supply arrangement comprises the fan unit, the path length of the air flow between the ionising member and the collecting member may be influenced by the location of the fan unit, since the air may pass the fan unit before reaching the collecting member.

The air supply arrangement may be configured, such that only air taken from an outside of the vehicle passes the air supply arrangement. The recirculated air may then be adapted to bypass the air supply arrangement.

The air flow may change direction at least once, such as two or three times, between the ionising member and the collecting member. Thereby it is possible to obtain the desired range of shortest path lengths of the air flow between the ionising member and the collecting member and yet obtain an air supply duct having suitable outer dimensions for being installed in the vehicle. The air flow may change direction within the air supply duct by at least 90° at each change, preferably at least 120°, more preferably at least 150°, most preferably around 180°. Each change may comprise sub-steps, e.g. two sub-steps of 90° making up a 180° change. Such sub-steps are within a few centimeters from each other, e.g. within less than 4 cm.

The air supply arrangement may comprise a cowl located in the air supply duct. The cowl can help to direct the air flow within the air supply arrangement. The cowl may help to remove any possible precipitation borne by the air coming from outside the vehicle, or at least part of it, such that this precipitation does not reach the collecting member. The cowl may make the air flow change direction within the air supply duct by at least 90°, preferably at least 120°, more preferably at least 150°, most preferably around 180°. Each change may comprise sub-steps, e.g. two sub-steps of 90° making up a 180° change. Such sub-steps are within a few centimeters from each other, e.g. within less than 4 cm.

The cowl may have a curved shape adapted to form an inner curve of the air flow. The outer curve of the air flow may be formed by walls of a housing forming the air supply arrangement. The curved form of the cowl may be selected to direct the air flow in a desired way. Forming the inner curve means that the path length of the air flow along the cowl is shorter than a path length along the walls of the housing.

The cowl may comprise a precipitation collection means arranged to collect precipitation borne by the air and to at least partly remove the precipitation from the air.

An example of such a cowl including precipitation collection means is described in patent document EP 2 479 046 A1, which is included herein as a reference. Components of the air supply arrangement, such as the ionising member, may be retrofitted into the air supply duct described in EP 2 479 046 A1.

The air supply arrangement may comprise a connector and a plenum cover structure located upstream of the housing. The connector comprises an entrance opening forming an inlet of the air supply arrangement. The connector forms a kind of duct through which the air passes. The plenum cover structure covers the inlet and may e.g. comprise a perforated plate. The plenum cover structure prevents objects, in particular objects larger than the holes of the plenum cover structure, from entering the air supply arrangement.

The disclosed invention further relates to an external portion of the air supply arrangement comprising the ionising member and a portion of the air supply duct being adapted to be located outside the passenger compartment of the vehicle. The external portion may, as an option, comprise at least one of the cowl, the connector or the plenum cover structure described herein. The external portion may correspond to the air supply duct described in EP 2 479 046 A1.

The disclosed invention also relates to a vehicle comprising the air supply arrangement as disclosed herein.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
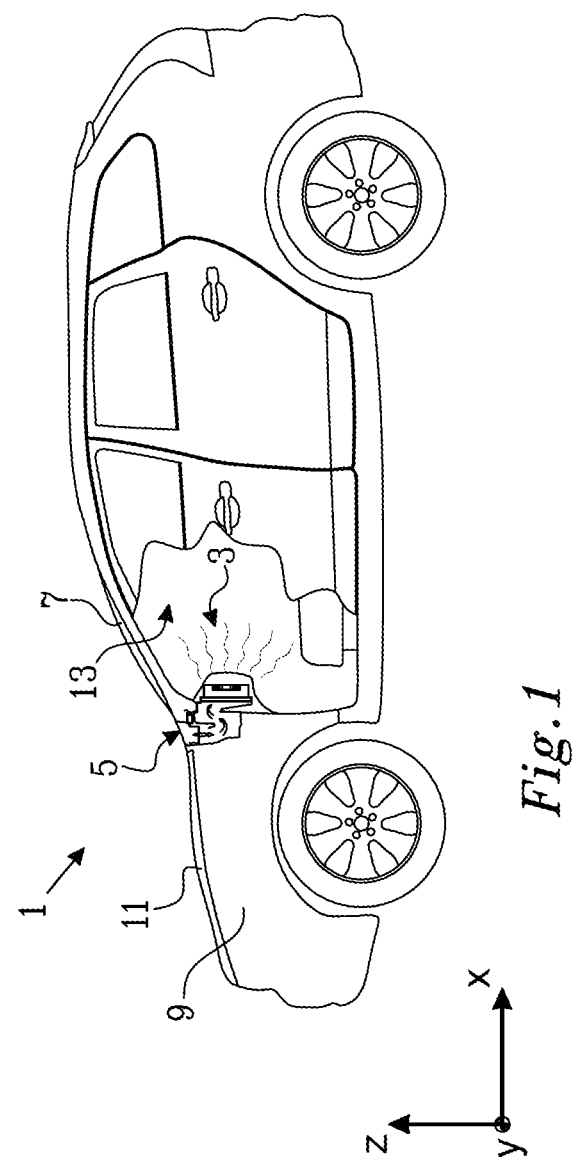
FIG. 1 is a schematic overview of a vehicle comprising an air supply arrangement according to the invention.

FIG. 1 schematically illustrates a vehicle 1 comprising an air supply arrangement 3 according to the invention. Typically, the air supply arrangement 3 is arranged in a region 5 between a windshield 7 and an engine compartment 9 of the vehicle 1. Alternatively, at least part of the air supply arrangement, such as an air inlet, may be arranged in a bonnet or hood 11 of the vehicle 1. The air supply arrangement 3 is adapted to convey the air to a climate control system (not illustrated) of the vehicle, such as an HVAC system, in order to be able to provide a passenger compartment 13 of the vehicle 1 with a desired climate.

Terms like vertical, horizontal, upper and lower used herein relate to when the air supply arrangement 3 according to the invention is mounted in the vehicle 1 assumed to be standing on a horizontal ground. However, the air supply arrangement may also be manufactured and sold as a separate unit and may then assume another orientation, e.g. during transport or storage. In addition, one or more of the components of the air supply arrangement 3 may be retrofitted into an existing air supply arrangement.

Figure 2:
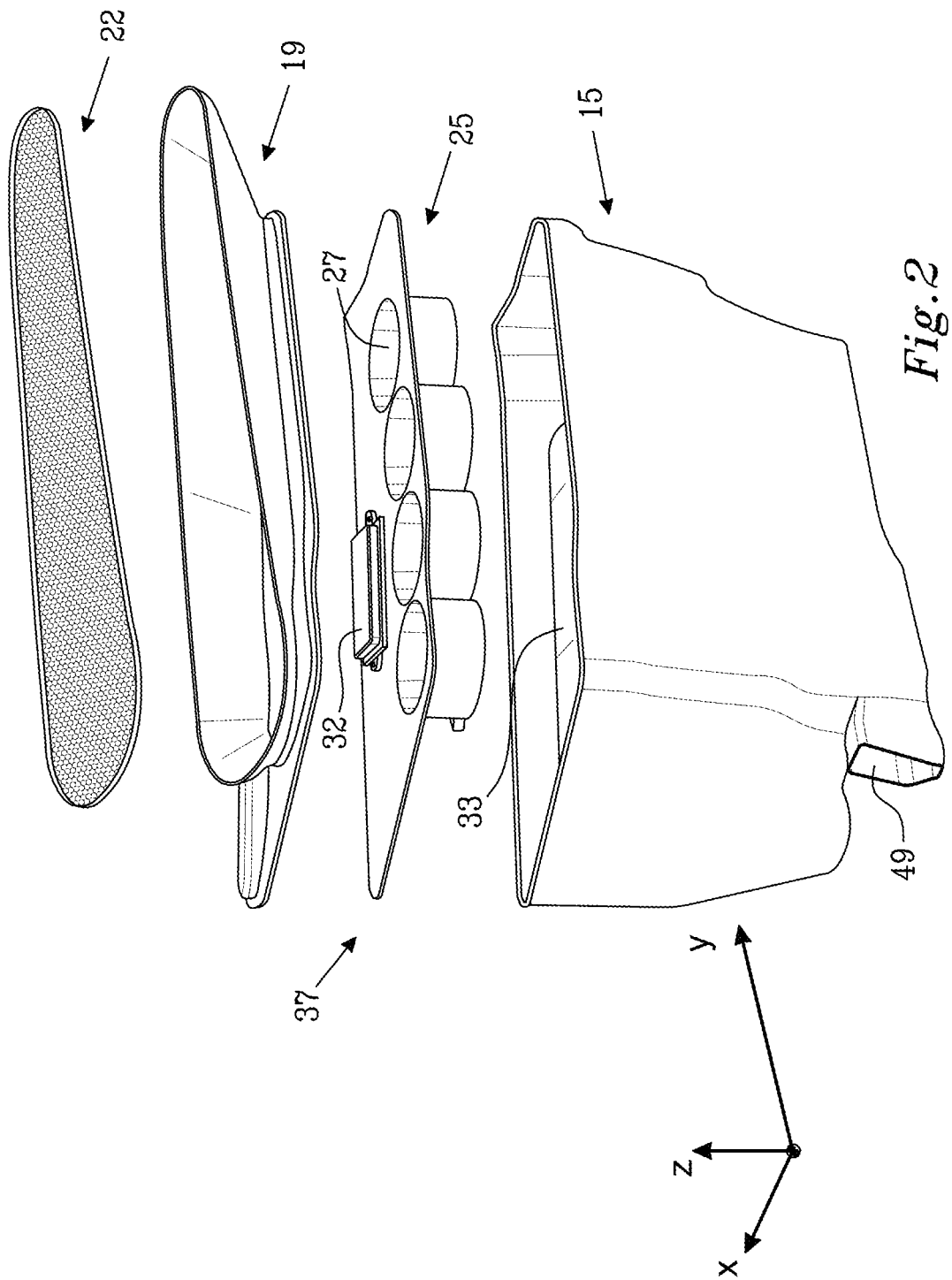
FIG. 2 is a perspective view of an external portion of an air supply arrangement according to the invention in an exploded view.
Figure 3:
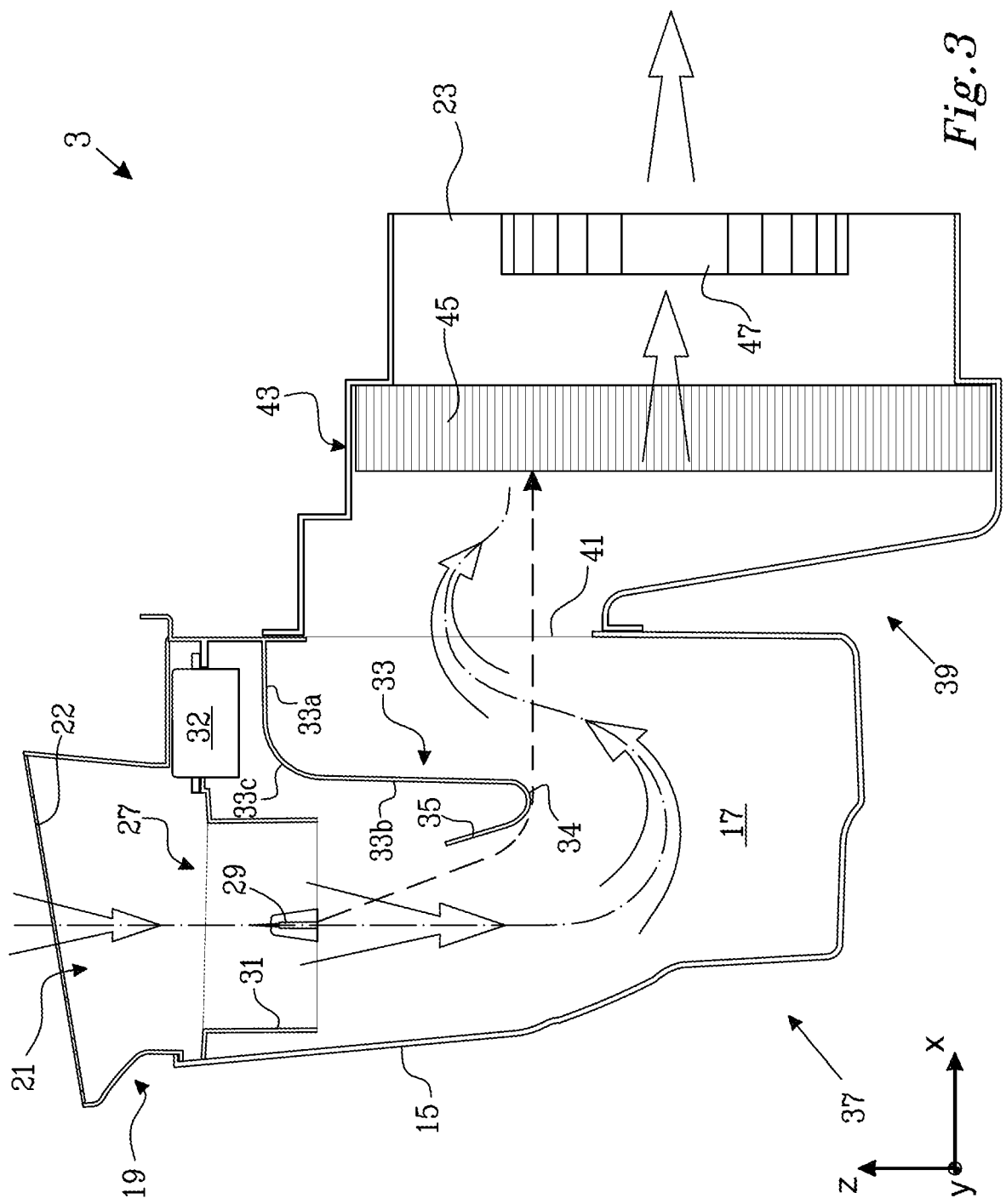
FIG. 3 is a cross-sectional side view of the air supply arrangement.
Figure 4:
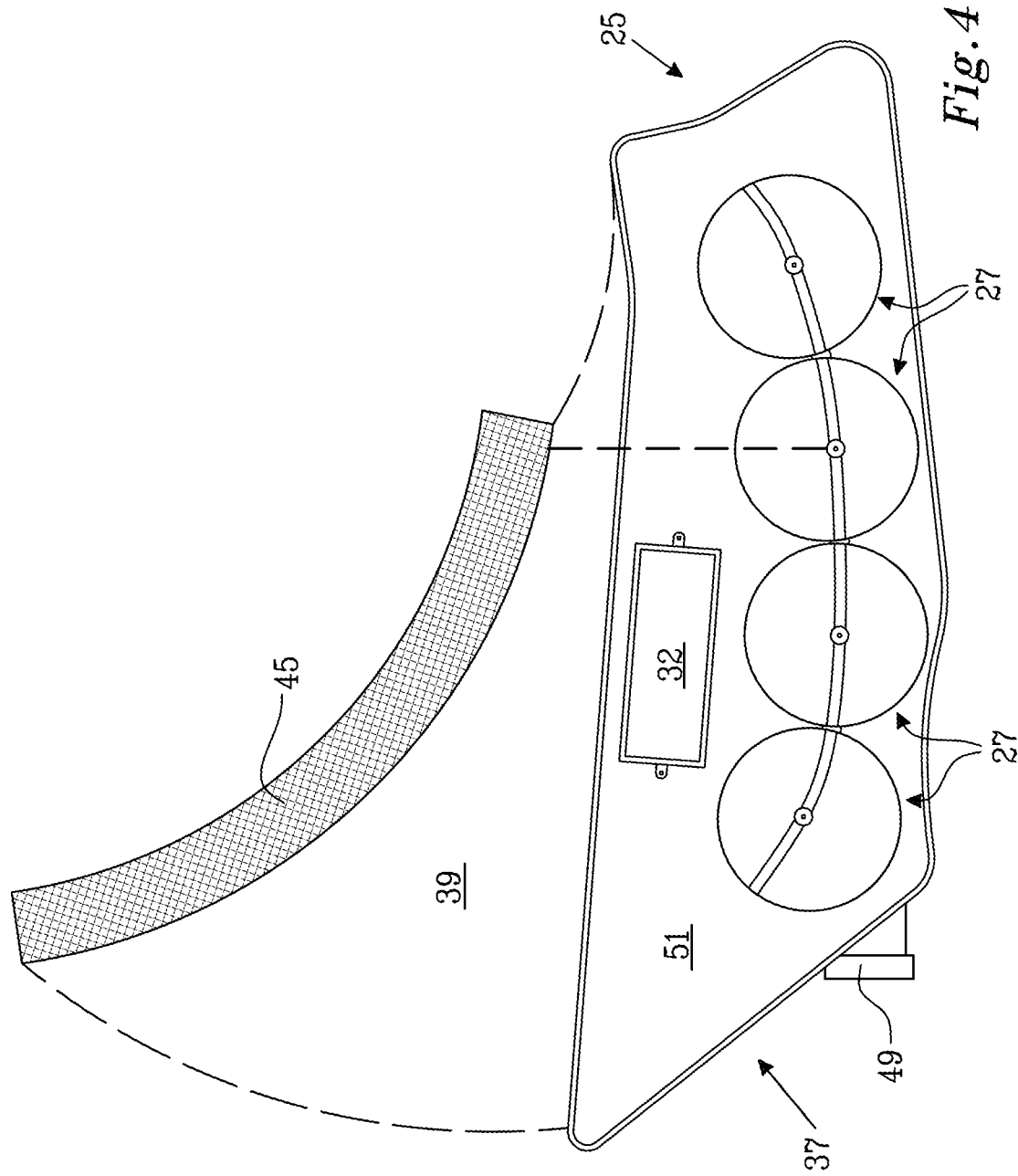
FIG. 4 is a top view of the air supply arrangement.

FIG. 2 illustrates a perspective view of an external portion 37 of the air supply arrangement 3 according to the invention in an exploded view. FIG. 3 illustrates a cross-sectional view of the air supply arrangement 3. FIG. 4 illustrates a top view of the air supply arrangement 3.

The air supply arrangement 3 comprises a housing 15 forming the outer shape of the external portion 37 of an air supply duct 17. The external portion 37 is located outside of, i.e. external to, the passenger compartment 13. The air supply duct 17 further comprises an internal portion 39 of the air supply arrangement 3 adapted to be located in the passenger compartment 13.

As an option, illustrated in FIGS. 2 and 3, the air supply arrangement 3 may also comprise a connector 19. The air supply arrangement 3 has an inlet 21, in the illustrated embodiment forming an entrance opening of the connector 19. The inlet 21 is adapted to receive air from outside of the vehicle 1. As an option, the inlet 21 may be covered by a plenum cover structure 22, e.g. a perforated plate as in the illustrated embodiment. The plenum cover structure 22 prevents in particular objects larger than the holes of the plenum cover structure 22 from entering the air supply arrangement 3. The connector 19 forms an air duct between the plenum cover structure 22 and the housing 15. The inlet 21 may be integrated into a windshield base panel. In such a case, the housing 15 is preferably connected to the windshield base panel with a tight sealing, such that substantially no air can leak into the air supply arrangement 3 apart from the air entering through the inlet 21. A water deflector, not illustrated, may be used for preventing water flowing along the windshield from entering the inlet 21. The air supply arrangement 3 further comprises an outlet 23 adapted to transfer the air to the climate control system (not illustrated) of the vehicle.

Figure 5:
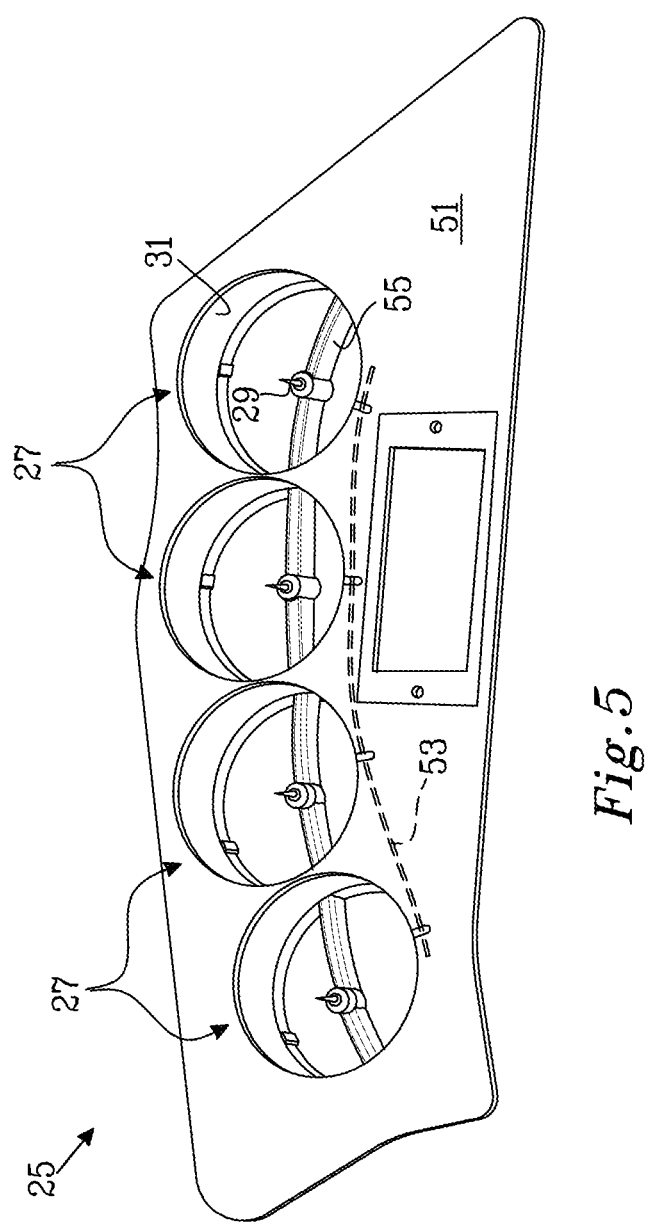
FIG. 5 is a perspective top view showing an ionisation member.

The air supply arrangement 3 comprises an ionising member 25 located in the air supply duct 17, such that the air passing through the inlet 21 thereafter passes the ionising member 25. The ionising member 25 comprises at least one discharge unit 27, shown as four discharge units 27 in the illustrated embodiment. Each discharge unit 27 comprises a corona tip 29 and a circularly ring-shaped grounding element 31. The ionising member 25, which is further described below in conjunction with FIG. 5, is utilized to charge particles being transported by the air passing the air supply duct 17. The charge is applied by an ioniser 32. The connector 19 may be used, directly or indirectly, to hold the ionising member 25 in place relative to the housing 15 in the air supply arrangement 3.

Downstream of the ionising member 25, a cowl 33 is arranged inside the housing 15, such that the cowl 33 can help to direct the air coming from the outside of the vehicle and passing through the air supply arrangement 3, see arrows in FIG. 3. Further, due to the cowl 33, the air flow changes direction at least once within the housing 15. In the illustrated embodiment, the air flow changes direction by about 180° when passing a lower end 34 of the cowl 33, from substantially vertically downwards to substantially vertically upwards. Moreover, it can be seen that the cowl 33 has a curved form forming an inner curve of the air flow while an outer curve of the air flow is formed by walls of the housing 15. The curved form of the cowl 33 is adapted to guide the air in a desired way. Forming the inner curve means that the path length of the air flow along the cowl 33 is shorter than a path length along the walls of the housing 15.

The cowl 33, when seen in cross-section, has a curved form comprising a first region 33a, which is substantially horizontal, and a second region 33b, which is substantially vertical. In between the first region 33a and the second region 33b, a transition region 33c forms a smooth transition between the first region 33a and the second region 33b.

If the cowl has another configuration than in the illustrated embodiment, the air flow may change direction in sub-steps, e.g. by two steps of about 90° making up a total change of about 180° when passing the lower end 34 of the cowl.

The cowl 33 of the air supply arrangement 3 comprises a precipitation collection means 35, in this embodiment exemplified by a gutter at the lower end 34 of the cowl 33. The precipitation collection means 35 may be formed as an integral part of the cowl 33, as illustrated, or it may be a separate part mounted to the cowl. The precipitation collection means 35 is arranged to collect at least parts of any precipitation being borne by the air passing through the air supply arrangement 3. The illustrated location of the precipitation collection means 35 has been found to be beneficial, since experiments have shown that the air flow can be arranged to have the highest flow volume substantially along the cowl 33, which, as mentioned above, forms the inner curve. Thereby, the precipitation collection means 35 may efficiently separate precipitation borne by the air from the rest of the air. Preferably, the precipitation collection means 35 is inclined in relation to a horizontal plane of the vehicle resulting in that any collected water flows towards the lowest point. A drainage arrangement (not illustrated) may be connected to the lowest point of the precipitation collection means 35. Such a cowl including precipitation collection means is described in patent document EP 2 479 046 A1, which is incorporated herein by reference. Further, the components of the air supply arrangement 3, such as the ionising member 25, may be retrofitted into the air supply duct described in EP 2 479 046 A1.

Examples of suitable materials for the housing 15 and the cowl 33 are moulded plastics and/or metal. The choice of material is preferably made having factors such as cost, production efficiency and vehicle safety in mind.

The length of housing 15 may be between 10 and 100 centimeters, preferably between 20 and 80 centimeters and most preferably between 20 and 60 centimeters, with the length dimension of the housing 15 being the same as the width dimension of the vehicle, i.e. along they axis of FIG. 2. Further, the width of the housing 15 may be between 10 and 60 centimeters, preferably between 15 and 50 centimeters and most preferably between 25 and 45 centimeters, with the width dimension of the housing 15 being the same as the length dimension of the vehicle, i.e. along the x axis of FIG. 2. Moreover, the height of the housing 15 may be between 10 and 60 centimeters, preferably between 15 and 50 centimeters and most preferably between 20 and 40 centimeters, with the height dimension being the same as the height dimension of the vehicle, i.e. along the z axis of FIG. 2. The dimensions of the housing 15 make up the dimensions of the external portion 37 of the air supply arrangement 3. The internal portion 39 has corresponding dimensions, which are adapted to the configuration of the vehicle 1, in which the air supply arrangement 3 is to be used.

The length of the cowl 33, in the y-direction of FIG. 2, may be between 5 and 40 centimeters, preferably between 10 and 30 centimeters. The width, in the x-direction of FIG. 2, may be between 5 and 30 centimeters, preferably between 10 and 20 centimeters. The height, in the z-direction of FIG. 2, may be between 5 and 30 centimeters, preferably between 10 and 20 centimeters.

The precipitation collection means 35 may protrude by between 0.2 and 4 centimeters from the walls of the cowl 33, preferably by between 0.3 and 2 centimeters and most preferably between 0.5 and 1 centimeter. The precipitation collection means 35 is directed towards the inlet 21 to collect precipitation from the incoming air.

As mentioned above, the housing 15 forms a first portion of the air supply duct 17. The housing 15 is located outside of, i.e. external to, the passenger compartment 13 and thus forms the external portion 37 of the air supply arrangement 3 together with the ionising member 25, the optional connector 19, the optional plenum cover structure 22 and the optional cowl 33. The air supply duct 17 further comprises the internal portion 39 of the air supply arrangement 3 adapted to be located in the passenger compartment 13. The air flows from the external portion 37 to the internal portion 39 via an opening 41 in the wall of the housing 15. Thereby the air flow changes direction again, e.g. by up to 180°, illustrated by arrows in FIG. 3. The dimensions of the opening 41 are influenced by the dimensions of the cowl 33. The opening 41 may extend along substantially the entire length of the cowl 33 or a part thereof. The height of the opening 41, i.e. in the z-direction of FIG. 3, is preferably between 5 and 15 centimeters.

Downstream of the cowl 33 and located in the internal portion 39, a collecting member 43 is located. The collecting member 43 is adapted to catch the particles having been charged by the ionising member 25. The collecting member 43 is passive, i.e. it has no electrical connection and there is no voltage applied over it. In the illustrated embodiment, the collecting member 43 comprises a polymer filter, e.g. a dielectric polymer filter 45. The ionising member 25 and the collecting member 43 together form an air cleaning unit. The function of this type of air cleaning units is known from patent document WO 98/50162 disclosing a method and a device for cleaning of a gaseous fluid. The collecting member 43, illustrated as the dielectric polymer filter 45 in FIGS. 3 and 4 assumes a shape adapted to the shape of the internal portion 39 of the air supply arrangement 3, which in turn is adapted to the configuration of the vehicle 1. In the illustrated embodiment, the dielectric polymer filter 45 has a curved shape, when seen from above as in FIG. 4. In FIG. 4, the connector 19 and the plenum cover structure 22 are removed for better visibility.

A shortest path length of the air flow between the ionising member 25 and the collecting member 43 is in the range of from 20 to 70cm, preferably in the range of from 25 to 50cm. The shortest path length of the air flow is determined as the theoretically shortest possible way for the air to go when passing through the air supply arrangement 3, see dashed line in FIGS. 3-4. The shortest path length starts at the ionising member 25. If it comprises a corona tip 29 or an ion brush, the shortest path length is determined from the corona tip 29 or the ion brush of the discharge unit 27 being closest to the collecting member 43, in the illustrated case the second discharge unit 27 from the right in FIG. 4. The shortest path length ends at the collecting member 43, illustrated as the dielectric polymer filter 45 in FIGS. 3 and 4. Due to the curved shape of the dielectric polymer filter 45 of the illustrated embodiment, the shortest path length ends adjacent to the right-hand edge of the dielectric polymer filter 45 as seen in the view of FIG. 4.

Lengths in this range have been found beneficial for the air cleaning efficiency. Further, by locating the collecting member 43 downstream of the cowl 33, possible precipitation has already been at least partly removed by the precipitation collection means 35. In addition, the location of the collecting member 43 makes it easy to change the dielectric filter 45 when desired, e.g. when the vehicle 1 is at a garage for service.

As an alternative the path length of the air supply arrangement may instead be determined along a central air flow line in the air flow, see dashed-dotted line in FIG. 3. The central air flow line is defined as being located in the geometrical center of the possible flow. The central air flow line may in the air supply arrangement 3 described herein have a path length being in the range of from 25 to 75 cm, preferably in the range of from 30 to 60cm.

The air supply arrangement 3 may further comprise a fan unit 47. In the illustrated embodiment, the fan unit 47 is located in the internal portion 39 of the air supply arrangement 3 downstream of the collecting member 43. It has been found beneficial to locate the fan unit 47 downstream of the collecting member 43, since the air has then passed both the precipitation collection means 35 and the collecting member 43 before reaching the fan unit 47 and is thus cleaner, as compared to locating the fan unit further upstream. However, a fan unit may also, as an alternative or a complement, be located in alternative positions, such as in the internal portion 39 upstream of the collecting member 43, in the external portion 37 downstream of the cowl 33, between the ionising member 25 and the cowl 33 or upstream of the ionising member 25. It would also be possible to have a fan unit in the climate control system downstream of the air supply arrangement 3.

As illustrated by FIGS. 1-4, the housing 15 forms a separate unit which is sealed from the engine compartment 9 of the vehicle 1. Thereby, no air may leak from the engine compartment 9 into the air supply arrangement 3. This is beneficial from an energy saving point of view, since air coming from the engine compartment 9 would, assuming a warm engine, have a higher temperature than the outside air. Therefore, in operating conditions of the climate control system, when there is a need to cool the air to provide a comfortable climate in the passenger compartment, warm air from the engine compartment 9 could result in a need for additional cooling, which consumes energy. However, with the air supply arrangement 3 according to the invention, substantially no air can leak from the engine compartment 9 and thus such additional cooling can be avoided. In particular, the temperature level triggering the air conditioning to start may be raised by avoiding leakage of warm air into the air supply arrangement 3.

FIG. 2 further illustrates that a drainage opening 49 may be arranged at a lower region of the housing 15. It is preferred that the drainage opening 49 is located at or close to the lowest point of the housing 15. Preferably, the drainage opening 49 comprises a non-return valve which is arranged to let precipitation, e.g. water, pass outwards from the air supply arrangement 3, but to prevent water and/or air from entering into the air supply arrangement 3.

FIG. 5 is a perspective top view showing the ionisation member 25, which is utilized to charge particles being transported by the air passing the air supply duct 17. The ionising member 25 comprises at least one discharge unit 27; illustrated as four discharge units 27 located next to each other in the illustrated embodiment. Each discharge unit 27 of the illustrated embodiment comprises a corona tip 29 and a grounding element 31 having a circular shape.

The grounding elements 31 are arranged in a carrier structure 51, such that they are located next to each other following the general shape of the housing 15. The grounding element 31 has a diameter in the range of from 20 to 150 mm, preferably in the range of from 50 to 100 mm, more preferably in the range of from 60 to 90 mm, most preferably in the range of from 70 to 80 mm. The grounding elements 31 are connected to each other and to vehicle ground by means of a grounding bar 53.

The corona tips 29 are connected to a high voltage bar 55, which may operate with a voltage in the range of from 2 to 15 kV, preferably in the range of from 5 to 10 kV, more preferably in the range of from 6 to 8 kV. The high voltage bar 55 is fed by the ioniser 32, which is illustrated in FIGS. 2-4.

It would be possible to use another number of discharge units 27, e.g. in the range of from 1 to 10 discharge units, preferably in the range of from 2 to 8, more preferably in the range of from 3 to 5. Instead of a corona tip 29, an ion brush may be used. Further, the shape of the discharge units 27 may be different as compared to the illustrated embodiments. The grounding elements may e.g. have a square, rectangular, hexagonal or other polygonal shape, an elliptic or oval shape. One grounding element may be arranged together with two or more corona tips to form a discharge unit 27, although it is preferred to arrange them pairwise, i.e. as in the illustrated embodiment.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An air supply arrangement for a vehicle, said air supply arrangement comprising:
   an air supply duct,
   a cowl located in said air supply duct, wherein the cowl is configured to change air flow direction within said air supply duct by at least 120 degrees,
   an ionising member, located in said air supply duct, and
   a passive collecting member, located in said air supply duct downstream of said ionising member, wherein a shortest path length of an air flow between said ionising member and said collecting member is in the range from 20 to 70 centimeters (cm), and
   wherein said air flow changes direction at least once between said ionising member and said collecting member.

2. The air supply arrangement according to claim 1, wherein said collecting member is a polymer filter.

3. The air supply arrangement according to claim 1, wherein said ionising member comprises at least one discharge unit, each discharge unit comprising at least one corona tip or an ion brush.

4. The air supply arrangement according to claim 3, wherein said at least one discharge unit comprises a grounding element.

5. The air supply arrangement according to claim 4, wherein said grounding element has a maximal transverse extension in the range from 20 to 150 millimeters (mm).

6. The air supply arrangement according to claim 1, wherein said ionising member utilizes a voltage in the range from 2 to 15 kV.

7. The air supply arrangement according to claim 1 further comprising:
   a fan unit, said fan unit being located downstream of said collecting member.

8. The air supply arrangement according to claim 1, wherein said air supply arrangement is configured such that only air taken from an outside of said vehicle passes said air supply arrangement.

9. The air supply arrangement according to claim 1, wherein said cowl has a curved shape adapted to form an inner curve of said air flow.

10. The air supply arrangement according to claim 1, wherein said cowl comprises a precipitation collection means arranged to collect precipitation borne by said air flow and to at least partly remove said precipitation from said air.

11. The air supply arrangement according to claim 1, further comprising:
    a connector and a plenum cover structure located upstream of said ionising member, said connector comprising an entrance opening forming an inlet of said air supply arrangement, said plenum cover structure covering said inlet.

12. An external portion of said air supply arrangement according to claim 1, said external portion comprising said ionising member and a portion of said air supply duct being located outside a passenger compartment of said vehicle.

13. A vehicle comprising the air supply arrangement according to claim 1.

14. The air supply arrangement of claim 1, wherein the air flow changes direction at least twice between the ionising member and the collecting member.

15. The air supply arrangement of claim 1, wherein the collecting member is located within a passenger compartment of the vehicle, and
    wherein the ionising member is located outside the passenger compartment of the vehicle.

16. An air supply arrangement for a vehicle, comprising:
    an air supply duct;
    a cowl located in the air supply duct, wherein the cowl is configured to change air flow direction within the air supply duct by at least 120 degrees;
    an ionising member located in the air supply duct; and
    a passive collecting member located in said air supply duct downstream of the ionising member,
    wherein a shortest path length of an air flow between the ionising member and the passive collecting member is in the range from 20 to 70 centimeters.

17. The air supply arrangement of claim 16, wherein the cowl is configured to change air flow direction by at least 150 degrees.

18. The air supply arrangement of claim 16, wherein the cowl is configured to change air flow direction by approximately 180 degrees.

* * * * *